(12) United States Patent
Kashihara et al.

(10) Patent No.: US 9,570,954 B2
(45) Date of Patent: Feb. 14, 2017

(54) CONTROL DEVICE-INTEGRATED ROTATING ELECTRIC MACHINE WHICH PREVENTS ENTRANCE OF DRIVE BELT ABRASION POWDER

(71) Applicant: MITSUBISHI ELECTRIC CORPORATION, Chiyoda-ku, Tokyo (JP)

(72) Inventors: Toshiaki Kashihara, Chiyoda-ku (JP); Yoshinobu Utsumi, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 444 days.

(21) Appl. No.: 14/096,415

(22) Filed: Dec. 4, 2013

(65) Prior Publication Data

US 2014/0354093 A1    Dec. 4, 2014

(30) Foreign Application Priority Data

Jun. 4, 2013  (JP) .................................. 2013-117597

(51) Int. Cl.
  *H02K 11/00*   (2016.01)
  *H02K 5/22*    (2006.01)
(52) U.S. Cl.
  CPC .................................... *H02K 5/225* (2013.01)
(58) Field of Classification Search
  CPC . H02K 11/00; H02K 11/0068; H02K 11/0073; H02K 11/04; H02K 11/046; H02K 5/00; H01R 13/405; H01R 43/24
  USPC ..................................................... 310/71, 89
  See application file for complete search history.

(56) References Cited

U.S. PATENT DOCUMENTS

| | | | |
|---|---|---|---|
| 2001/0022477 A1* | 9/2001 | Ishida | H02K 5/225 310/71 |
| 2006/0125240 A1* | 6/2006 | Kato | H02K 11/048 290/31 |

FOREIGN PATENT DOCUMENTS

| | | | | |
|---|---|---|---|---|
| JP | 6-48363 | U | 6/1994 | |
| JP | 9-9562 | A | 1/1997 | |
| JP | 2001-145325 | A | 5/2001 | |
| JP | 200217067 | A | 1/2002 | |
| JP | 2003-254390 | A | 9/2003 | |
| JP | 2006-85960 | A | 3/2006 | |
| JP | 2006085960 | A * | 3/2006 | ........... H01R 13/406 |

(Continued)

OTHER PUBLICATIONS

Machine translation of JP 2006085960 A (Mar. 2006).*

(Continued)

*Primary Examiner* — Michael Andrews
(74) *Attorney, Agent, or Firm* — Sughrue Mion, PLLC; Richard C. Turner

(57) ABSTRACT

A control device-integrated rotating electric machine includes: a rotor integrally supported by a rotary shaft; a stator; a front case and a rear case; a pulley provided on a part of the rotary shaft, the part being protruded from the front case; a control circuit portion provided outside the rear case; a cover for covering the control circuit portion; and a rotating electric machine-side connector provided for the control circuit portion, the rotating electric machine-side connector being provided outside the cover. The rotating electric machine-side connector has a connection side that is oriented so as to be inclined on a side separating from the pulley with respect to a direction orthogonal to a width direction of the pulley, in which a belt is looped.

5 Claims, 3 Drawing Sheets

(56) References Cited

FOREIGN PATENT DOCUMENTS

| | | |
|---|---|---|
| JP | 2006166681 A | 6/2006 |
| JP | 4072394 B2 | 4/2008 |
| JP | 4431418 B2 | 3/2010 |
| JP | 2011234513 A | 11/2011 |
| JP | 2012-143036 A | 7/2012 |

OTHER PUBLICATIONS

Communication dated Feb. 10, 2015 from the Japanese Patent Office in counterpart application No. 2013-117597.
Communication dated Jul. 22, 2014 from the Japanese Patent Office in counterpart Japanese Patent Application No. 2013117597.

* cited by examiner

CONTROL DEVICE-INTEGRATED ROTATING ELECTRIC MACHINE WHICH PREVENTS ENTRANCE OF DRIVE BELT ABRASION POWDER

BACKGROUND OF THE INVENTION

1. Field of the Invention

The present invention relates to a control device-integrated rotating electric machine.

2. Description of the Related Art

As a drive device for a motor generator, for example, Japanese Patent Application Laid-open No. 2012-143036 discloses a configuration in which a connector is arranged on the outer side in a radial direction as a method for decreasing the size of the entire drive device in an axial direction. In addition, as a method for preventing a connector signal line from interfering with other members, there is disclosed a configuration in which a connector connection port is formed so as to be oriented toward a motor in the axial direction to improve the connector inserting and removing performance.

Further, Japanese Patent No. 4072394 discloses a belt transmission device that is used for a device for driving an auxiliary machine of an engine. The belt transmission device includes an automatic tensioner in which a tension pulley is rotatably supported at a leading end of a swingable arm. This automatic tensioner adjusts the tension of a transmission belt looped around a plurality of pulleys.

The auxiliary machine drive device includes an auxiliary machine having a starter function and a power generator function. When the auxiliary machine is used as the starter motor, its drive force is transmitted to the engine via the belt to start-up the engine. On the other hand, during driving after the start-up of the engine, the drive force generated by the engine is transmitted to the auxiliary machine via the belt to maintain the drive of the auxiliary machine.

Further, Japanese Patent Application Laid-open No. 2003-254390 discloses a power transmission belt such as a V-ribbed belt and a raw edge V-belt, which considers the quietness at the time of start-up of the engine. In the power transmission belt, a compressed rubber layer made of vulcanized rubber is provided at a contact surface between the motor generator and the pulley. In this manner, the coefficient of friction is decreased to reduce the noise generated when the motor generator is driven.

However, as the vulcanized rubber, there are employed hydrogenated nitrile rubber, chloroprene rubber, natural rubber, CSM, ACSM, SBR, ethylene-α-olefin elastomer, etc., which are formed of organic compounds. Therefore, when the auxiliary machine is driven (when the engine is started up), the belt is may be worn due to the large tension and the large rotational force of the pulley, which may cause a problem in that organic compound powder scatters.

Note that, as a structure for preventing the belt abrasion powder from scattering, Japanese Patent No. 4431418 discloses a configuration in which a cover is provided so as to cover a drive pulley.

However, in a motor generator that is directly mounted to an internal combustion engine of an automobile or the like, during continuous driving, vibration may be transmitted to a connector connection terminal portion in response to the vibration of the internal combustion engine or the vibration due to the angular acceleration generated when rapid acceleration and deceleration are repeated. As a result, packing for preventing foreign matters from entering the connector connection terminal portion from the outside may be worn.

From this worn gap portion, the above-mentioned belt abrasion powder of the power transmission belt and moisture may enter the connector. When the inside of the connector becomes a moistened state, the impedance between the terminals may be reduced to cause a pre-tracking phenomenon in which a minute current flows between the terminals. Then, when the pre-tracking phenomenon occurs repeatedly, the phenomenon develops to a tracking phenomenon in which a connector resin between the terminals is carbonized, and eventually, there is a fear in that a tracking short-circuit state in which discharge occurs even in a dried state may be caused.

Further, as a measure for preventing the belt abrasion powder of the power transmission belt from scattering, it is conceivable to use the above-mentioned cover disclosed in Japanese Patent No. 4431418. However, when the cover is provided so as to cover the drive pulley, the number of components is increased. Therefore, it is difficult to employ the cover in reality in view of cost increase. Further, there arises another problem in that the maintenance performance is impaired at the time of belt replacement.

SUMMARY OF THE INVENTION

The present invention has been made in view of the above-mentioned circumstances, and has an object to provide a control device-integrated rotating electric machine that is capable of preventing drive belt abrasion powder from entering a connector connection terminal portion.

In order to achieve the above-mentioned object, according to one embodiment of the present invention, there is provided a control device-integrated rotating electric machine, including: a rotor integrally supported by a rotary shaft; a stator provided opposed to the rotor; a front case and a rear case for receiving the rotor and the stator; a pulley provided on a part of the rotary shaft, the part being protruded from the front case; a control circuit portion provided outside the rear case; a cover for covering the control circuit portion; and a rotating electric machine-side connector provided for the control circuit portion, the rotating electric machine-side connector being provided outside the cover, in which the rotating electric machine-side connector has a connection side that is oriented so as to be inclined on a side separating from the pulley with respect to a direction orthogonal to a width direction of the pulley, in which a belt is looped.

According to one embodiment of the present invention, it is possible to prevent the drive belt abrasion powder from entering the connector connection terminal portion.

DETAILED DESCRIPTION OF THE PREFERRED EMBODIMENT

Figure 1:
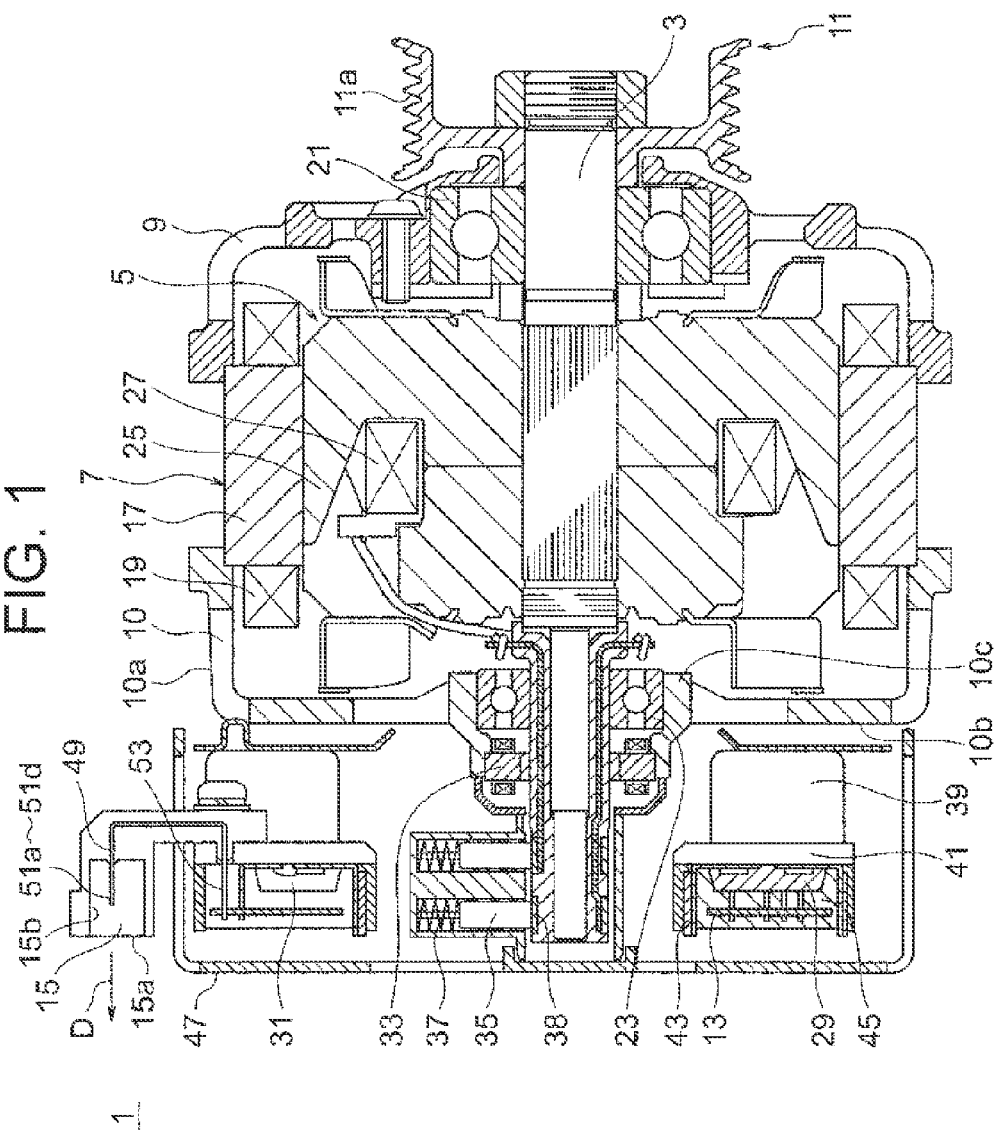
FIG. 1 is a sectional view illustrating a configuration of a control device-integrated rotating electric machine according to a first embodiment of the present invention.

Now, a control device-integrated rotating electric machine according to an embodiment of the present invention is described with reference to the accompanying drawings. In the drawings, the same or corresponding components are denoted by the same reference symbols.

First Embodiment

Figure 2:
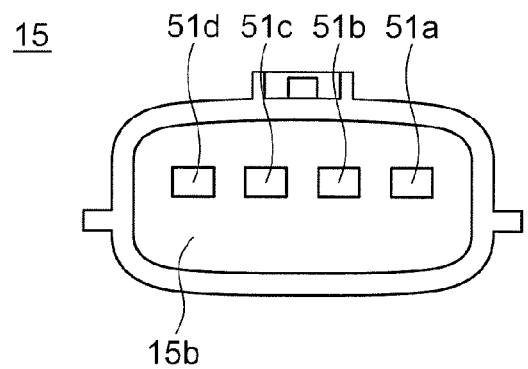
FIG. 2 is a front view of a male connector of the control device-integrated rotating electric machine according to the first embodiment of the present invention.
Figure 3:
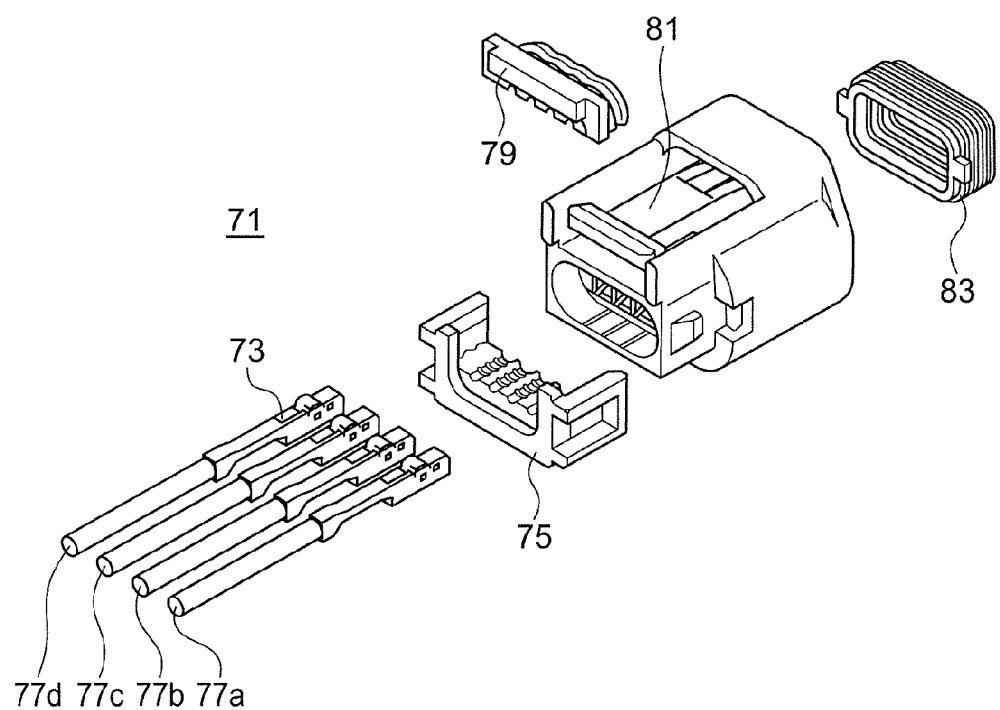
FIG. 3 is a perspective view illustrating a configuration of a vehicle-side female connector that is to be connected to the male connector of FIG. 2.

FIG. 1 is a sectional view illustrating a configuration of a control device-integrated rotating electric machine according to a first embodiment of the present invention. FIG. 2 is a front view of a male connector portion of the control device-integrated rotating electric machine according to the first embodiment of the present invention. FIG. 3 is a perspective view illustrating a configuration of a vehicle-side female connector portion that is to be connected to the male connector portion of FIG. 2.

A control device-integrated rotating electric machine 1 includes a rotor 5 provided on a rotary shaft 3, a stator 7 provided opposed to the rotor 5, a front case 9 and a rear case 10 for receiving the rotor 5 and the stator 7, a pulley 11, a control circuit portion 13, and a rotating electric machine-side connector 15.

The stator 7 is provided around the rotor 5. The stator 7 includes a stator core 17 and a stator winding 19, and is fixed to the inner peripheral surfaces of the front case 9 and the rear case 10.

The rotary shaft 3 is rotatably supported by a pair of bearings 21 and 23. The bearing 21 supporting one end side of the rotary shaft 3 is fixed to the front case 9, while the bearing 23 supporting the other end side of the rotary shaft 3 is fixed to the rear case 10.

The rotor 5 includes a rotor core 25 integrally supported by the rotary shaft 3, and a field winding 27 wound around the rotor core 25.

On an end wall of the rear case 10 on the opposite side to the front case 9, a stator circuit portion 29, a field circuit portion 31, and the control circuit portion 13, which serve as a power circuit unit, are mounted. The control circuit portion 13 controls an electrical circuit unit including the stator circuit portion 29 and the field circuit portion 31.

On the other end side of the rotary shaft 3, a magnetic pole position detection sensor 33 for detecting the rotation state of the rotor 5 is provided on the opposite side to the front case 9 with respect to the bearing 23. Further, on the other end side of the rotary shaft 3, brushes 35 are provided on the opposite side to the front case 9 with respect to the magnetic pole position detection sensor 33. The brushes 35 are retained by a brush holder 37, and are respectively provided in abutment against two slip rings 38 that rotate integrally with the rotary shaft 3.

On a part of the one end of the rotary shaft 3, which is protruded from the front case 9, the pulley 11 for inputting and outputting power to the control device-integrated rotating electric machine 1 is provided. The pulley 11 is arranged on the rotary shaft 3 on the opposite side to the rear case 10 with respect to the bearing 21.

The pulley 11 has a plurality of valley portions 11a arrayed along a width direction in which the belt is looped. The control device-integrated rotating electric machine 1 is configured as follows. Power is transmitted to the engine via a V-ribbed belt looped around the valley portions 11a to start up the engine. On the other hand, during driving after the start-up of the engine, the drive force from the engine is transmitted to an auxiliary machine by the belt to drive the auxiliary machine.

As illustrated in FIG. 1, the rear case 10 includes a cylindrical peripheral wall 10a that is assembled to the front case 9, an end wall 10b that closes one end of the peripheral wall 10a, and a hollow cylindrical wall 10c that extends from the center of the end wall 10b in an axial direction toward the inside of the case and supports the bearing 23.

Further, on the rear case 10 on the opposite side to the front case 9, a heat sink 41 provided with a radiating fin 39 is provided. The radiating fin 39 is provided on one surface side of the heat sink 41, and the other surface side of the heat sink 41 is connected to the stator circuit portion 29 and the field circuit portion 31. Further, the stator circuit portion 29 and the field circuit portion 31 are electrically connected to the stator winding 19 and the field winding 27, respectively, by a wiring member 43.

The control circuit portion 13 including a control board formed of a printed circuit board provided with a control circuit is provided outside the rear case 10, and is received and fixed inside a board receiving portion 45. The control board of the control circuit portion 13 is arranged in a direction orthogonal to the rotary shaft 3.

The control circuit portion 13, the stator circuit portion 29, the field circuit portion 31, the brushes 35, the heat sink 41, and the like, which are provided outside the rear case 10, are covered with a cover 47. The cover 47 is provided with the rotating electric machine-side connector 15 to be connected to a vehicle-side connector terminal from an external apparatus in order to transmit and receive a signal between the external apparatus and the control circuit portion 13. In particular, the rotating electric machine-side connector 15 is arranged on the cover 47 on the opposite side to the stator circuit portion 29. That is, the rotating electric machine-side connector 15 is separated from the stator winding 19 and the stator circuit portion 29, which are large heat generating sources in the control device-integrated rotating electric machine 1. Further, regarding the radial direction, the rotating electric machine-side connector 15 is arranged at a further radially outward position with respect to the outer diameter of the stator 7.

The rotating electric machine-side connector 15 includes a connector terminal 49 formed by insert molding. One end of the connector terminal 49 includes rotating electric machine-side connector terminals 51a to 51d, and the other end of the connector terminal 49 includes a control board connection terminal portion 53. The connector terminal 49 has substantially a U-shape as viewed in the cross section of FIG. 1. Further, the leading ends of the rotating electric machine-side connector terminals 51a to 51d and the leading end of the control board connection terminal portion 53 are oriented in the same direction. Further, the rotating electric machine-side connector 15 has an opening 15b at a connection side 15a, and the rotating electric machine-side connector terminals 51a to 51d are protruded inside the opening 15b.

Now, the vehicle-side female connector that includes a vehicle-side connector terminal from the external apparatus is described with reference to FIG. 3. A vehicle-side connector 71 is made of a synthetic resin material and has a plurality of (four in the example of FIG. 3) cavities 73. A hood portion 75 is provided around the front end side of a terminal receiving portion in which the four cavities 73 are provided so as to be arrayed in the lateral direction. Inside the respective cavities 73, vehicle-side connector terminals 77a to 77d formed of female-side terminal fittings each fixed to a terminal of an electric wire are inserted from the rear side.

The vehicle-side connector terminals 77a to 77d are fixed in a state of being prevented from slipping out by a lance 79 provided on the ceiling surface of each cavity 73. With a lock arm 81 provided to the ceiling part of the hood portion 75, the rotating electric machine-side connector 15 is locked in a fitting state, and the male and female connectors are sealed across packing 83.

Figure 4:
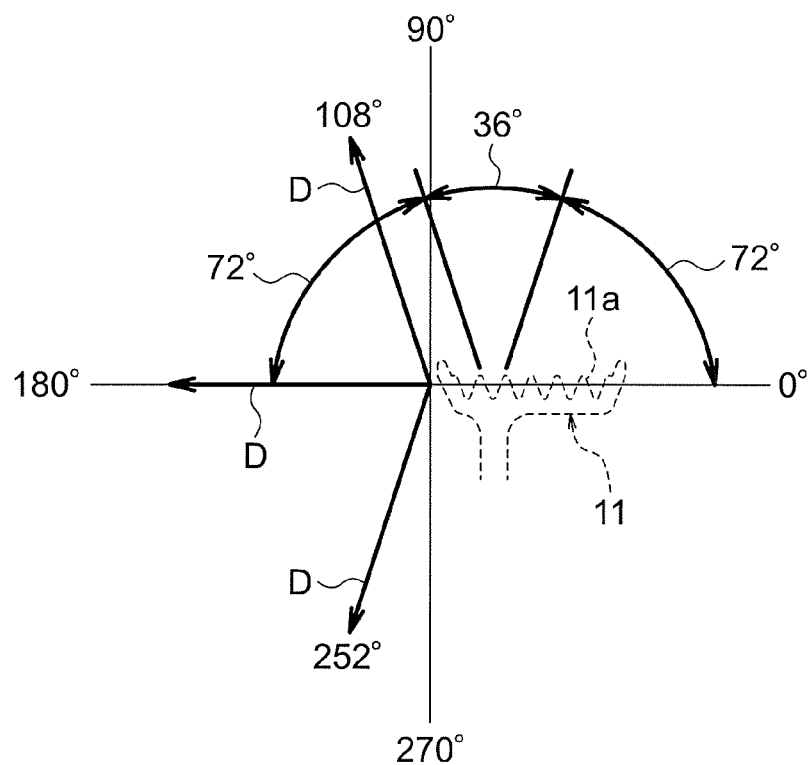
FIG. 4 is a conceptual diagram illustrating an orientation state of rotating electric machine-side connector terminals of a rotating electric machine-side connector in the first embodiment of the present invention.

Next, details of the rotating electric machine-side connector are described with reference to FIGS. 1, 2, and 4. FIG. 4 is a conceptual diagram illustrating an orientation state of the rotating electric machine-side connector terminals 51a to 51d of the rotating electric machine-side connector 15.

The rotating electric machine-side connector 15 includes the plurality of (four in the example of FIG. 2) rotating electric machine-side connector terminals 51a to 51d that are laterally arranged so as to correspond to the vehicle-side connector terminals 77a to 77d. The orientation of the connection side 15a of the rotating electric machine-side connector 15 (in the first embodiment of the present invention, orientation of the opening 15b and orientation in which the rotating electric machine-side connector terminals 51a to 51d are directed) is set as follows.

That is, as illustrated in FIG. 4, when a region of the pulley 11 in the width direction in which the belt is looped (direction in which a belt support surface in which the plurality of valley portions 11a are arrayed extends) is set as a reference line with the angle of 0° (so-called positive part in the X axis when the cross section of FIG. 1 is represented in an orthogonal coordinate system), the orientation of the connection side 15a of the rotating electric machine-side connector 15 (orientation represented by an arrow D in FIGS. 1 and 4) is inclined on a side separating from the pulley 11 with respect to a direction orthogonal to the width direction of the pulley, in which the belt is looped (so-called Y axis when the cross section of FIG. 1 is represented in the orthogonal coordinate system). That is, the orientation of the connection side 15a of the rotating electric machine-side connector 15 is at least larger than 90° and smaller than 270° in FIG. 4. The connection side 15a of the rotating electric machine-side connector 15 is preferred to be oriented in an angular range of 108° to 252° in FIG. 4. Generally, a pulley using a V-ribbed belt has a groove angle of 36° as illustrated in FIG. 4, and hence the V surface of the pulley inclines by 72° with respect to the horizontal direction. Therefore, as long as the angular range is 108° to 252° in FIG. 4, the orientation of the rotating electric machine-side connector 15 is inclined within a range that is at least smaller than 72° with respect to the horizontal direction on the opposite side to the pulley 11. Thus, entrance of belt powder can be more effectively prevented. Further, when the connection side 15a of the rotating electric machine-side connector 15 is viewed in the extending direction of the rotary shaft 3, such a mode that the connection side 15a is oriented toward the opposite side to the pulley 11 is preferred. That is, such a mode that the connection side 15a of the rotating electric machine-side connector 15 is oriented at substantially 180° in FIG. 4 is preferred, and this most preferred mode is illustrated in FIG. 1.

When the corresponding vehicle-side connector terminals 77a to 77d are respectively connected to the rotating electric machine-side connector terminals 51a to 51d of the rotating electric machine-side connector 15 and a battery power of 12 V is supplied, the power of the control board of the control circuit portion 13 is turned ON. The control circuit portion 13 receives an ON or OFF signal of a vehicle-side key switch and obtains state information on whether the vehicle is activated or stopped. In this manner, the control board performs drive control or power generation control. The rotating electric machine-side connector terminal 51c is electrically connected to the vehicle-side connector terminal 77c and is set as a high potential side of CAN communication. The rotating electric machine-side connector terminal 51d is electrically connected to the vehicle-side connector terminal 77d and is set as a low potential side of CAN communication. As inputs to the rotating electric machine-side connector terminals 51c and 51d, a potential difference and time information are sent from a vehicle-side ECU (external control apparatus). Based on the potential difference and time information, the control board performs the drive control or the power generation control.

According to the control device-integrated rotating electric machine of the first embodiment of the present invention, which is configured as described above, the following advantages can be obtained. First, as a background, problems surrounding the control device-integrated rotating electric machine are described. In a vehicle such as an automobile, in recent years, the use of electronics has progressed, and the number of electrical wirings for connecting the electronic apparatus has rapidly increased. Along therewith, the number of poles of the connector used for wiring connection has increased as well. A terminal is inserted inside the connector, and when a plurality of terminals are inserted, it is common for the terminals to have a potential difference therebetween. Further, in the vehicle, the motor generator is installed inside the engine compartment. A connector installed in such a location is placed under a severe environment such as dew condensation caused by the temperature cycle inside the engine compartment, entrance of dust and the like during running on a rough road, and adhesion of snowmelt salt water at winter. Further, the drive belt on which tension and rotational force act may be worn and its abrasion powder may scatter to the vicinity of the connector. Under such a situation, when moisture or an organic insulator such as dust and abrasion powder adheres to the terminals inside the connector, micro-discharge may occur between the terminals having a potential difference to cause a pre-tracking phenomenon. When this phenomenon is repeated, deterioration (moist deterioration) of the terminal progresses, and a tracking phenomenon in which a connector resin between the terminals is carbonized may occur, which may eventually lead to a tracking short circuit in which discharge occurs even in a dried state. Further, the connector used for wiring connection of an automobile is a multi-pole connector having a plurality of poles. For example, in a single connector, a terminal for a circuit to which a positive potential is applied and a terminal for a ground circuit having a negative potential coexist. The respective terminals are inserted and fixed to a housing of a connector, which is made of a resin and called a cavity, and are insulated from each other at an impedance of 100 MΩ or more. Further, a voltage of the battery power supply that is used in a general vehicle such as an automobile is generally 24 V or less. Therefore, the current flowing between the terminals is as minute as 0.2 μA or less. It is said that at least 50 mA is necessary for start of the tracking short circuit, and hence the problem does not occur in a general case. However, in a motor generator that is directly mounted to the internal combustion engine of an automobile or the like, during continuous driving, vibration is transmitted to a connector connection terminal portion in response to the vibration of the internal combustion engine or the vibration due to the angular acceleration generated when rapid acceleration and deceleration are repeated. As a result, packing for preventing foreign matters from entering the connector connection terminal portion from the outside may be worn. From this worn gap portion, dust, moisture, or the like may enter the connector to establish a moistened state. As a result, the impedance between the terminals may be reduced to cause a minute current to flow between the terminals. In particular, in a case where electrolyte liquid (in particular, snowmelt salt water or the like) enters, the impedance value becomes very low and a relatively large current is liable to flow. There is a problem in that, due to the current discharge that occurs as described above, the connector may be damaged.

To address such a problem, in the first embodiment of the present invention, the orientation of the connection side of the rotating electric machine-side connector is inclined on the side separating from the pulley with respect to the direction orthogonal to the width direction of the pulley, in which the belt is looped. Therefore, even when the packing provided for preventing foreign matters from entering the rotating electric machine-side connector from the outside is worn, it is possible to prevent the drive belt abrasion powder from entering the rotating electric machine-side connector. Further, in particular, when the connection side of the rotating electric machine-side connector is oriented toward the opposite side to the pulley as viewed in an extending direction of the rotary shaft, it is possible to prevent entrance of the belt abrasion powder more notably. Moreover, the prevention of the entrance of the drive belt abrasion powder into the rotating electric machine-side connector does not rely on a cover for preventing scattering of the belt abrasion powder, and hence it is possible to avoid increasing the number of components and to obtain the structure at low cost. In addition, while satisfactorily maintaining the maintenance performance at the time of belt replacement, the effect of preventing entrance of the belt abrasion powder can be obtained. Note that, the four connector terminals respectively have potential differences. Therefore, in view of the fact that the tracking phenomenon progresses fast, in a control device-integrated rotating electric machine as that according to the first embodiment of the present invention, the above-mentioned effect of preventing entrance of the belt abrasion powder is extremely beneficial.

Further, the rotating electric machine-side connector is arranged on the cover on the opposite side to the stator circuit portion, that is, the rotating electric machine-side connector is sufficiently separated from the stator winding and the stator circuit portion, which are large heat generating sources in the control device-integrated rotating electric machine. Therefore, the connector is not influenced by the radiant heat, and thus heat generation at the connector can be prevented. Further, contact resistance of the rotating electric machine-side connector (rotating electric machine-side connector terminals) is not changed, and thus communication control with small communication error can be performed.

Further, the control board formed of the printed circuit board provided with the control circuit is received and fixed inside the board receiving portion, and is arranged so as to be orthogonal to the rotary shaft. Thus, the control device-integrated rotating electric machine can be shortened in the axial direction, and downsizing thereof can be realized.

Further, the rotating electric machine-side connector includes the connector terminal formed by insert molding, and the connector terminal is formed into a U-shape. Thus, regarding a mold for insert molding, which is necessary for exposing the respective terminals, masking for resin molding is performed in substantially the same direction, and hence the mold for molding can be easily formed. Further, the connector terminal is formed into substantially a U-shape, and hence bending forming can be facilitated and the material yield increases.

The contents of the present invention have been specifically described above by way of the preferred embodiment, but it is apparent that various modifications can be made by a person skilled in the art based on the basic technical idea and teaching of the present invention.

What is claimed is:

1. A control device-integrated rotating electric machine, comprising:
   a rotor integrally supported by a rotary shaft;
   a stator provided opposed to the rotor;
   a front case and a rear case for receiving the rotor and the stator;
   a pulley provided on a part of the rotary shaft, the part being protruded from the front case;
   a control circuit portion provided outside the rear case;
   a cover for covering the control circuit portion; and
   a rotating electric machine-side connector provided for the control circuit portion, the rotating electric machine-side connector, in its entirety, being completely provided outside the cover,
   wherein the rotating electric machine-side connector has a connection side that is oriented so as to be inclined on a side separating from the pulley with respect to a direction orthogonal to a width direction of the pulley, in which a belt is looped,
   wherein, when the width direction of the pulley, in which the belt is looped, is set as a reference line with an angle of 0°, the connection side of the rotating electric machine-side connector is oriented in an angular range of 108° to 252°, and
   wherein the rotating electric machine-side connector is arranged at a further radially outward position with respect to the outer diameter of the stator.

2. A control device-integrated rotating electric machine according to claim 1, wherein, when the connection side of the rotating electric machine-side connector is viewed in an extending direction of the rotary shaft, the connection side is oriented toward an opposite side to the pulley.

3. A control device-integrated rotating electric machine according to claim 1, further comprising a stator circuit portion provided outside the rear case,
   wherein the stator circuit portion is covered with the cover, and
   wherein the rotating electric machine-side connector is arranged on the cover on an opposite side to the stator circuit portion.

4. A control device-integrated rotating electric machine according to claim 1, wherein the control circuit portion comprises a control board arranged in a direction orthogonal to the rotary shaft.

5. A control device-integrated rotating electric machine according to claim 1,
   wherein the rotating electric machine-side connector comprises a connector terminal formed by insert molding, and
   wherein the connector terminal is formed into a U-shape.

* * * * *